Nov. 14, 1933.  A. G. FORSYTH  1,935,501
FLEXIBLE COUPLING
Filed April 13, 1933
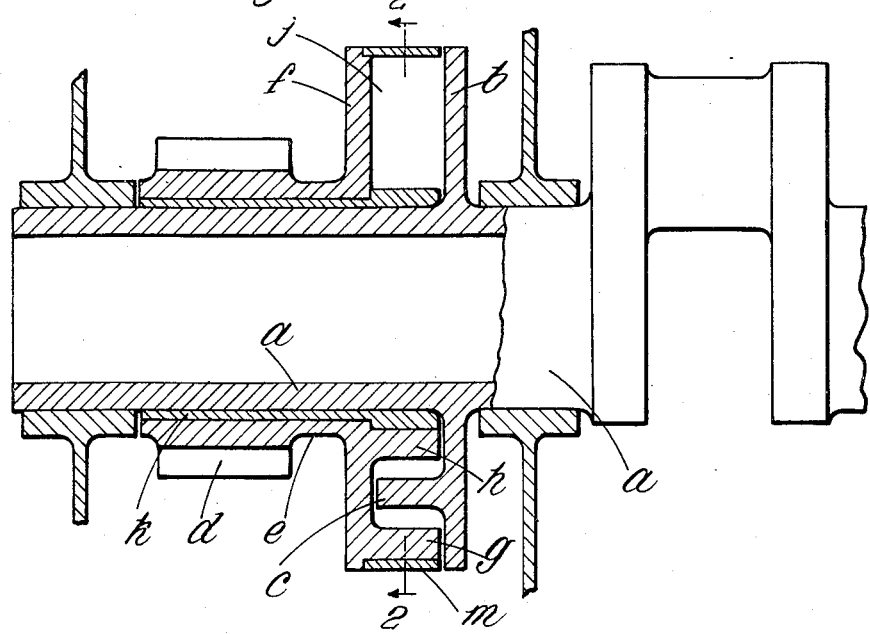
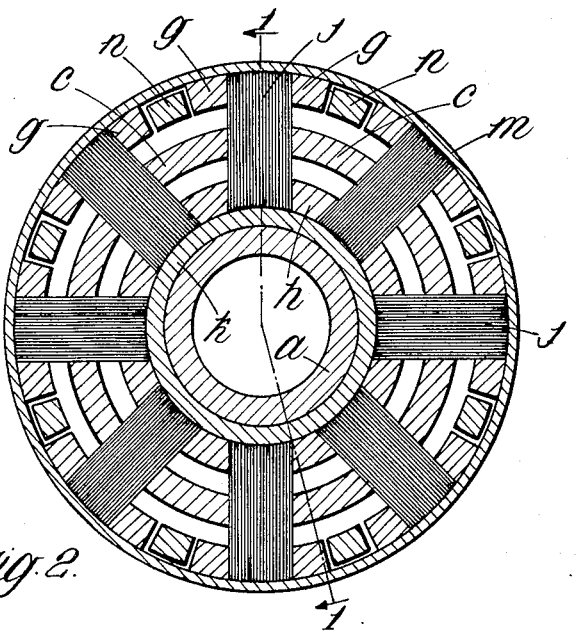
INVENTOR
Archibald Graham Forsyth
BY
ATTORNEY Patented Nov. 14, 1933

1,935,501

UNITED STATES PATENT OFFICE 1,935,501

FLEXIBLE COUPLING

Archibald Graham Forsyth, Cheam, England, assignor to The Fairey Aviation Company Limited, Hayes, England Application April 13, 1933, Serial No. 666,056, and in Great Britain June 8, 1932

3 Claims. (Cl. 64—100)

This invention relates to a flexible coupling for interposition between a driving and a driven shaft and has for its object an improved construction of coupling which is particularly applicable for use on aircraft.

A flexible coupling has been proposed in which the driving and driven elements are provided the one with a plurality of packs of leaf springs disposed radially of the member in angularly spaced relationship and with lateral abutments towards their opposite ends and the other with a plurality of dog teeth in angularly spaced relationship thereon and adapted to engage said packs of leaf springs intermediately of their ends.

According to the present invention the second mentioned member carries a second set of dog teeth adapted to abut against fixed parts on the first member after a predetermined relative angular movement of the two members has taken place.

The lateral abutments for the packs of leaf springs are in the form of dog teeth on the first mentioned member, that is to say, said member is formed with two sets of dog teeth one set being at a greater, and the other at a less, radial distance than those on the second mentioned member, the set of dog teeth at the greater radial distance being arranged in pairs and constituting the abutments for the second set of dog teeth on the second mentioned member.

One form of the invention is illustrated by the accompanying drawing, Figure 1 being a sectional side elevation on the line 1—1, Figure 2, and Figure 2 a cross section on the line 2—2, Figure 1.

The drawing shows that a driving shaft $a$ is provided with a circumferential flange $b$, from one side of which projects a circular series of dog teeth $c$. Rotatable on the shaft $a$ is a driven member consisting of a gear wheel $d$ integral with a sleeve $e$ which is provided with a circumferential flange $f$ from one side of which project two circular series of dog teeth $g$ and $h$ so arranged at different radial distances that the dog teeth $c$ of the driving member lie radially between those $g$ and $h$ of the driven member. Packs of leaf springs $j$ disposed radially of the driven member are arranged with their inner and outer ends between pairs of dog teeth $g\,g$ and $h\,h$ of the two series so as to bridge the space between said two series, hence when the parts are assembled the dog teeth $c$ of the driving member extend between adjacent packs of leaf springs $j$ on the driven member. A bush $k$ within the sleeve $e$ of the driven member and a shroud ring $m$ encircling the outer series of dog teeth $g$ on said member serve to prevent endwise movement of the leaf springs $j$.

The dog teeth $g$ of the outer series on the driven member do not extend the full circumferential distance between the outer ends of two adjacent packs of leaf springs $j\,j$ but are arranged in pairs leaving spaces into which project the dog teeth $n$ of a second circular series on the driving member. A predetermined clearance is left between these teeth $g$ and $n$ so that in use, the torque applied by the main set of dog teeth $c$ on the driving member approximately at the centres of length of the packs of leaf springs $j$ causes said packs to yield until the second or safety set of dog teeth $n$ on the driving member contact with the outer dog teeth $g$ of the driven member and transmit the drive therethrough thus preventing the packs of leaf springs $j$ from being overloaded.

If, desired, the member carrying the packs of leaf springs may constitute the driving member.

I claim:—

1. A flexible coupling for interposition between a driving shaft and a driven shaft, comprising a driving element and a driven element, a plurality of packs of leaf springs disposed radially of said coupling in angularly spaced relationship, abutments for said packs disposed towards the opposite ends of each pack and projecting laterally from one of said elements, fixed parts on said first element, and two circular series of dog teeth both in angularly spaced relationship on the other of said elements, the one series being adapted to engage said packs of leaf springs intermediately of their ends, and the other series being adapted to abut against fixed parts of the first element after a pre-determined relative angular movement of the two elements has taken place.

2. A flexible coupling for interposition between a driving shaft and a driven shaft, comprising a driving element and a driven element, a plurality of packs of leaf springs disposed radially of said coupling in angularly spaced relationship, two concentric circular series of dog teeth both in angularly spaced relationship and constituting abutments for said packs disposed towards the opposite ends of each pack, and projecting laterally from one of said elements, fixed parts on said first element, and two circular series of dog teeth both in angularly spaced relationship on the other of said elements, the one series being adapted to engage said packs of leaf springs intermediately of their ends and the other series being adapted to abut against fixed parts of the first element after a pre-determined relative angular movement of the two elements has taken place.

3. A flexible coupling for interposition between a driving shaft and a driven shaft, comprising a driving element and a driven element, a plurality of packs of leaf springs disposed radially of said coupling in angularly spaced relationship, two concentric circular series of dog teeth both in angularly spaced relationship and constituting abutments for said packs disposed towards the opposite ends of each pack and projecting laterally from one of said elements, the dog teeth of the outer series being arranged in pairs, fixed parts on said first element, and two circular series of dog teeth both in angularly spaced relationship on the other of said elements, the one series being adapted to engage said packs of leaf springs intermediately of their ends, and the other series on said second element being interposed between said pairs of dog teeth on the first element and adapted to abut against teeth of said pairs of dog teeth after a predetermined relative angular movement of the two elements has taken place.

ARCHIBALD GRAHAM FORSYTH.